May 4, 1943.　　W. F. GROENE ET AL　　2,318,155
GUN RIFLING MACHINE
Filed Dec. 11, 1941　　3 Sheets-Sheet 1
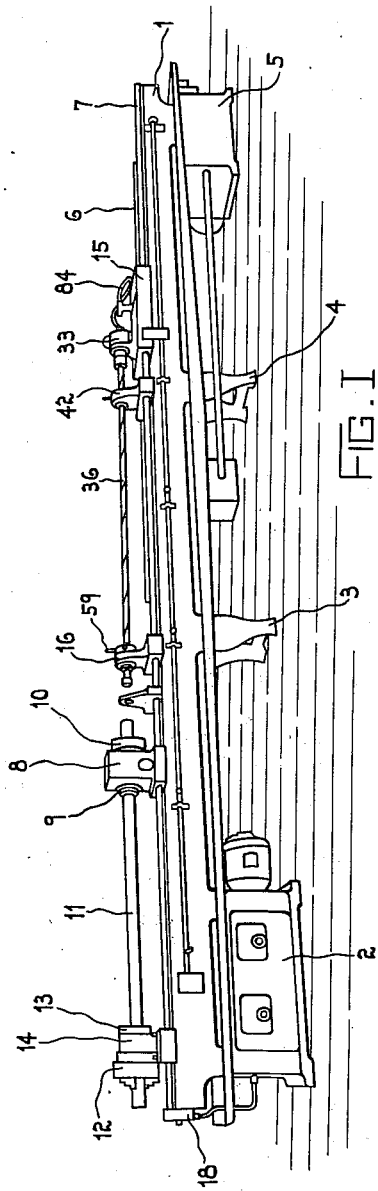
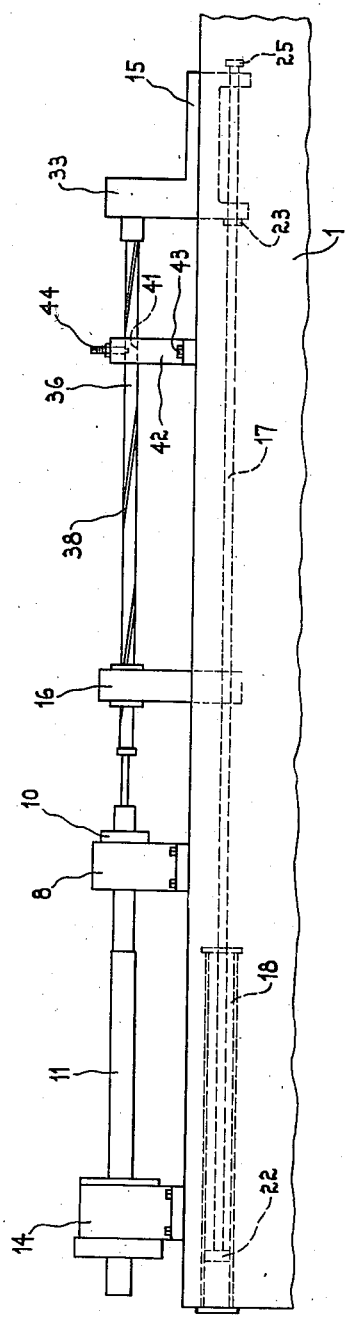
INVENTORS.
WILLIAM F. GROENE
HARRY F. STOFFREGEN JR.
BY May 4, 1943.  W. F. GROENE ET AL  2,318,155
GUN RIFLING MACHINE
Filed Dec. 11, 1941   3 Sheets-Sheet 2
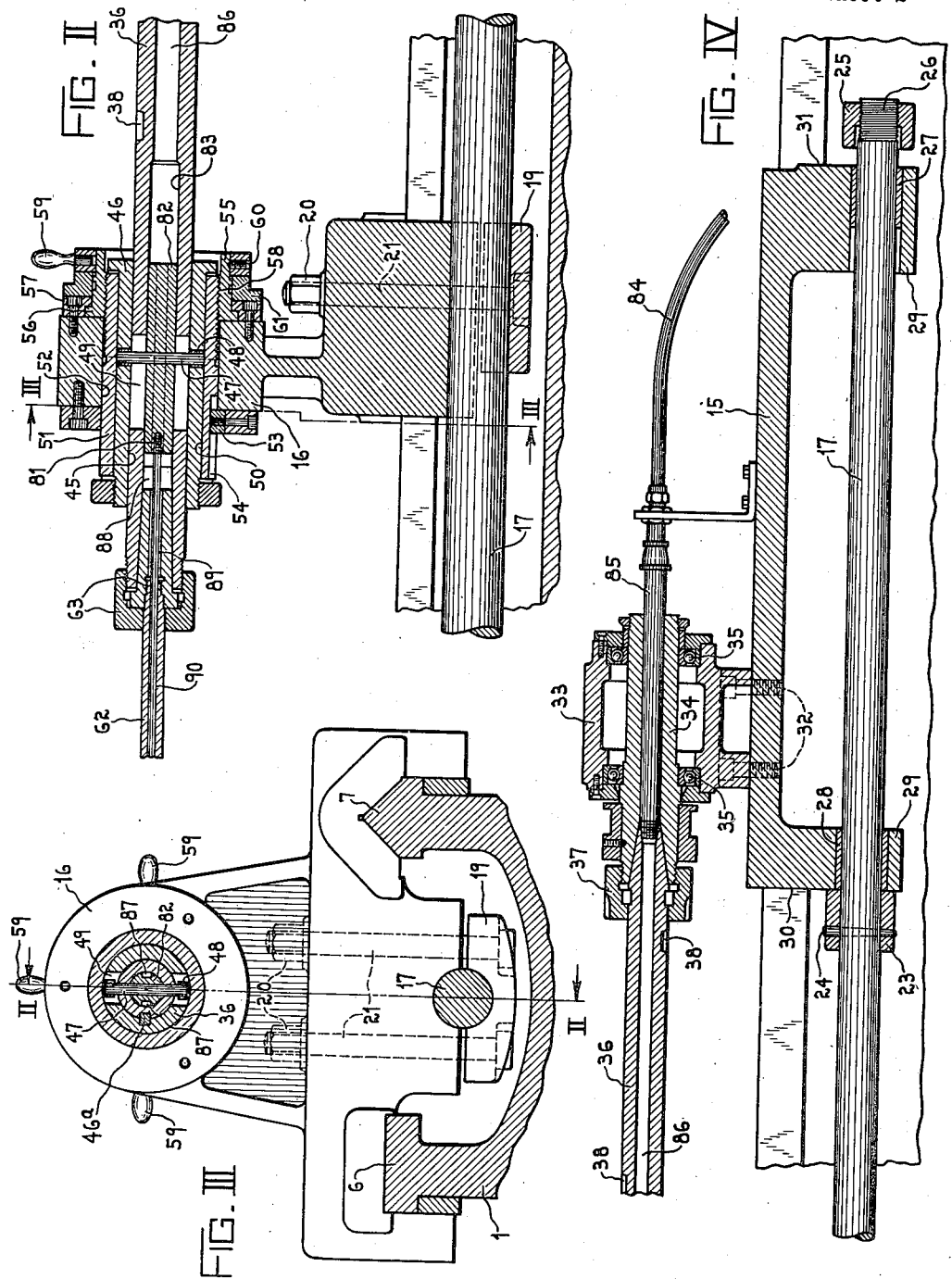
INVENTORS.
WILLIAM F. GROENE
HARRY F. STOFFREGEN JR.
BY
Willard S. Groene

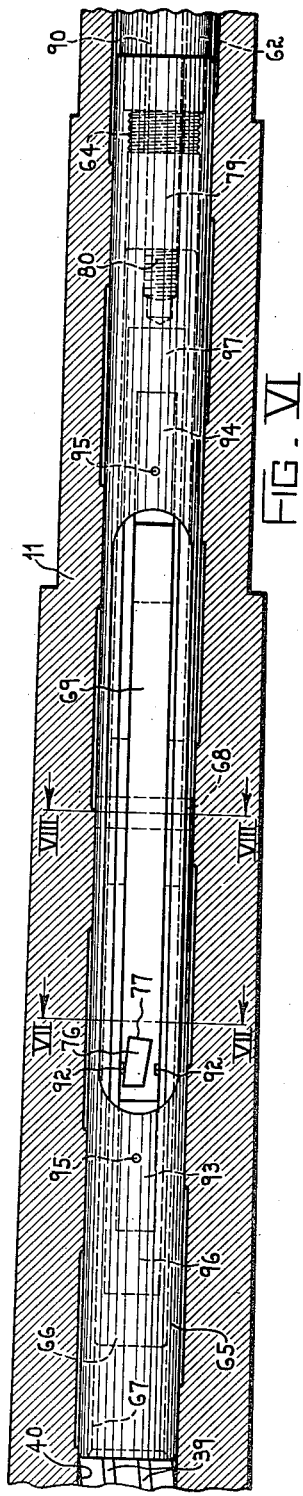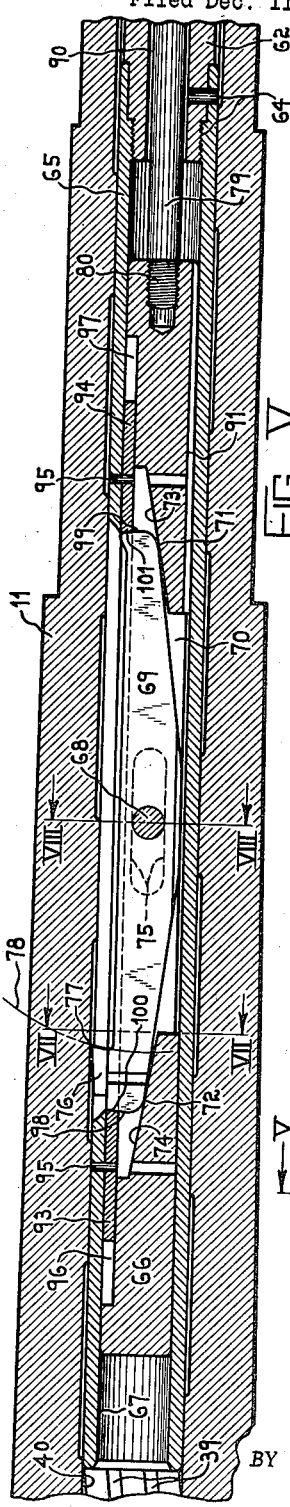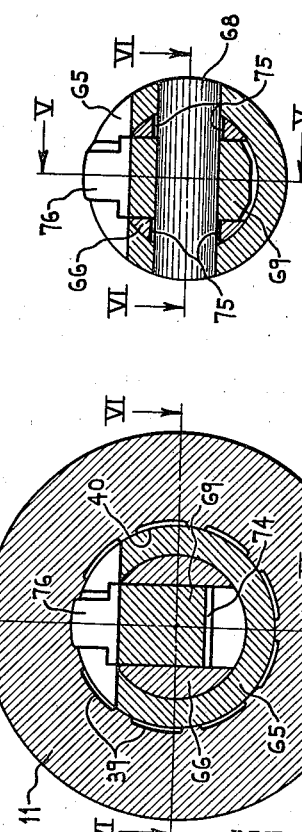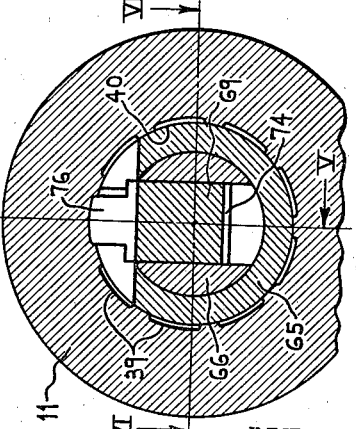

Patented May 4, 1943

2,318,155

UNITED STATES PATENT OFFICE 2,318,155

GUN RIFLING MACHINE

William F. Groene and Harry F. Stoffregen, Jr., Cincinnati, Ohio, assignors to The R. K. Le Blond Machine Tool Company, Cincinnati, Ohio, a corporation of Delaware Application December 11, 1941, Serial No. 422,474

4 Claims. (Cl. 90—28.1)

This invention pertains to gun rifling machines, and is specifically related to cutting tool supporting and actuating mechanism used in conjunction with such machines for cutting the rifling grooves in the bore of a gun barrel. This invention is related to our co-pending application Serial No. 390,090 filed April 24, 1941. One of the chief purposes of this invention is to provide a rifling cutting tool which is of such design as to completely eliminate vibration and chatter in the cutting tool as it is being drawn through the gun barrel to effect the cutting of the rifling grooves.

It is also an object of this invention to design a rifling tool support which avoids the use of flexible or spring mounted tool holder mechanism and which may be adjusted automatically for tool relief movement during the return stroke after cutting each rifle groove.

It is also an object to provide a rifling groove cutting tool holder comprising a solid integral member pivotally mounted on a sliding tubular carrier member operating in the gun bore and in which the cutting tool edge is formed integrally therewith.

And it is a further object to provide, in conjunction with such an arrangement, means for automatically moving said pivotal tool holder and tool in tool relief movement and to proper depth of cut by mechanism in which there is no backlash between the tool carrier and the pivotal tool holder mounted thereon at any time during the tool relief movement.

Certain specific improvements in the application of the cutting coolant to the tool holder and tool are also contemplated.

Further features and advantages of this invention will appear from the detailed description of the drawings in which:

Figure I is a front perspective view of a typical gun rifling machine incorporating the principles of this invention.

Figure II is an enlarged sectional view taken longitudinally of the machine on the line II—II of Figure III, particularly showing the mechanism for advancing the tool in cutting relation to the groove to be cut in the gun bore for each additional depth of cut of the tool in the various rifling grooves.

Figure III is an axial view of the tool feeding unit of Figure II shown particularly in the line III—III of Figure II.

Figure IV is a longitudinal section of the feeding carriage slidably mounted on the bed ways.

Figure V is a vertical longitudinal section through the rifling tool mounting mechanism shown in section on the line V—V in Figures VII and VIII.

Figure VI is a horizontal longitudinal section of the gun barrel and rifling tool holder particularly showing the top view of the pivoting cutting tool holder and its cutting tool point, shown on the line VI—VI of Figures VII and VIII.

Figure VII is an enlarged transverse sectional view through the gun barrel and rifling tool supporting mechanism shown on the line VIII—VIII of Figures V and VI.

Figure VIII is a similar transverse enlarged sectional view through the rifling tool supporting mechanism taken at its pivot end joint shown on the line VIII—VIII of Figures V and VI.

Figure IX is an end view of the gun barrel at the completion of the rifling operation showing the relationship of the bore to the rifling grooves in the gun.

Figure X is a diagrammatic view showing the essential elements comprising the apparatus for operating the novel rifling tool supporting mechanism.

For exemplary purposes this invention is shown applied to a gun rifling machine comprising a bed 1 which is carried on legs 2, 3, 4, and 5, and has appropriate ways 6 and 7 prepared on its upper surface. On these ways 6 and 7 is fixed the indexing work carrying head 8 having a rotatable work spindle 9 suitably journaled in the housing 8 and having a work gripping chuck 10 for gripping the gun barrel 11. The outer end of the gun barrel 11 is mounted in a similar fixture having a work gripping chuck 12 carried on a freely rotatable spindle 13 in the outer supporting housing 14 so as to serve as a rotating steady rest for supporting the outer end of the gun barrel 11.

Slidably mounted on the ways 6 and 7 of the bed 1 is the rifling bar carriage 15 and the tool feeding unit 16. The unit 16 is arranged to be clamped directly to the piston rod 17 of the feeding and rapid traversing cylinder 18 fixed in the bed 1 of the machine, by means of a suitable clamp 19 which may be locked to the rod 17 by tightening the nuts 20 on the bolts 21, shown best in Figures II and III, so that this feeding unit is at all times carried in either direction by the motion of the piston 22 in the cylinder 18 in actuating its piston rod 17 in feeding or rapid traverse movement.

Also the carriage 15 is similarly actuated from the piston rod 17 of the cylinder 18 but in delayed motion relative to the feeding unit 16 when reversal of feed and rapid traverse takes place. This arrangement comprises a collar 23 fixed to the piston rod 17 by suitable pin 24 and an adjustable collar 25 appropriately connected by threaded means 26 to the outer end of the piston rod 17, the piston rod 17 passing through suitable supporting bearings 27 and 28 in depending central portions 29 of the carriage 15. The collar 23 is arranged to abut against the surface 30 of the carriage 15 when effecting the feeding or cutting direction of movement of the carriage 15 and upon reversal of the piston 22 in cylinder 18 the piston rod 17 then moves in the opposite direction, to the left in Figure IV, to bring the collar 25 in engagement with the abutment surface 31 on the rear portion 29 of the carriage 15 so as to ultimately begin movement of this carriage 15 when its collar 25 is moved to engagement with the surface 31. During this delayed reversal movement to the carriage 15, of course, the tool feeding unit 16 at all times moves in positive relationship with the piston rod 17 to which it is rigidly clamped by the nuts 20 as described.

Fixed on the carriage 15 by suitable screws 32 is the rifling bar spindle housing 33 which carries the rifling bar spindle 34 on suitable bearings 35 for free rotation in the housing 33 against axial movement. To this spindle 34 is appropriately connected the spiral grooved rifling bar 36 by means of suitable coupling means 37.

This rifling bar 36 has an appropriate spiral groove 38 formed therein of precisely the lead desired for the rifling grooves 39 to be formed in the bore 40 of the gun barrel 11, Figure IX. This rifling bar 36 is arranged for sliding motion through an appropriate bore 41 formed in the support member 42 fixed to the bed 1 of the machine by suitable screws 43 and which carry a plunger screw 44 which is arranged to nicely engage in the groove 38 so that as the bar 36 is moved through the member 42 by motion of the carriage 15 it will be rotated in proper spiral angular movement to effect the proper lead in the rifling 39 to be formed in the gun 11.

Referring particularly to Figures II and III the outer end of the spiral grooved rifling bar 36 is slidably carried in the bore 45 of the sleeve 46 and rotates the sleeve 46 through the medium of the key 46a, Figure III. A pin 47 is mounted by means of suitable shoes 48 in the sleeve 46 and which passes through slotted portion 49 formed in the rifling bar 36 so as to permit axial movement of the bar 36 relative to the sleeve 46. The sleeve 46 is journaled against axial movement in the bore 50 of the feed adjusting sleeve 51 which is arranged for axial sliding motion in the bore 52 of the feed adjusting unit 16 and is confined from rotation in said bore 52 by means of a suitable key 53 fixed to the unit 16 which operates in a keyway 54 formed in the outside diameter portion of the sleeve 51.

The feed adjusting sleeve 51 may be accurately moved axially in the bore 52 of the unit 16 by means of an adjusting nut 55 which is confined aganist axial movement relative to the unit 16 by means of its flanged portion 56 and the clamp ring 57 fixed to the unit 16 so that while the nut may be rotated it will have no relative axial motion with respect to the unit 16. This nut 55 has an appropriate threaded connection 58 with the sleeve 51 and it may be rotated by means of the pilot hand wheel 59 suitably connected to it by a screw 60 so that as the hand wheel 59 is rotated the sleeve 51 may be accurately moved in the bore 52 of the unit 16 to likewise cause similar motion in the rotatable sleeve 46 and the pin 47 may thus be adjusted lengthwise of the bar 36. A suitable graduated collar 61 may be utilized in conjunction with the hand wheel 59 for accurate setting of the relative position of the bushing 51 and associated sleeve 46 and pin 47 to effect accurate and careful adjustment of the depth of cut to be taken by the rifling tool as will now be described.

Referring particularly to Figures II, V, and VI, to the end of the spiral grooved rifling bar 36 is appropriately fixed the rifling tool bar 62 by suitable coupling means 63 and to the outer end of this bar 62 is appropriately fixed by suitable connecting means 64 the rifling tool head comprising the main outer sleeve 65 which is thus positively connected to the bar 62 and the spiral rifling grooved bar 36 so as to move directly with it in both axial and rotary motion. Inside of this main sleeve portion 65 is slidably mounted the tool feeding and relieving member 66 which is slidably axially in the bore 67 of the sleeve 65. On a pivot pin 68, also referring to Figures VII, and VIII, is mounted the cutting tool member 69 which is arranged in a cut away portion 70 formed in the member 66 and having each end portion 71 and 72 which engage the taper actuating portions 73 and 74 respectively formed in the member 66. A suitable clearance slot 75 is formed in the member 66 to permit relative sliding motion in the bore 67 of the member 65. On the tool holder 69 is formed the cutting bit 76 having a suitable cutting edge 77 arranged to operate upon the various rifle grooves 39 to be formed in the bore 40 of the gun barrel.

It will be seen, particularly referring to Figure V, that relative sliding motion of the member 66 in the bore 67 of the sleeve 65 will cause the relative swinging motion of the cutting edge 77 of the cutting tool 76 in an arc of relative movement 78 the purpose of which movement is to effect the relief of the tool away from the work when it is being moved through the bore, to the left in Figure V, for the beginning of each cutting stroke and also to effect relative outward adjustment of each return cutting position of the cutting edge 77 relative to the bore of the gun so as to effect increasing depth of cut to finally complete the various grooves to be rifled. A significant detail of construction of this particular tool holder lies in the fact that no resilient or spring mounted members of any kind are utilized which would ordinarily result in chatter and lack of accurate control particularly in returning the tool away from the bore of the work during the tool relief motion at the end of each cut. This is accomplished by providing the rigid tool holder 69 with its integral tool 76. The tool holder is mounted on the pin 68 and has a firm nicety of engagement simultaneously with the surfaces 73 and 74 on the member 66 at all times so that as the member 66 is adjusted relative to the sleeve 65 the tool 76 will be in positive control both in its movement outwardly towards the work and return away from the work while at the same time providing a rigid, non-resilient structure for supporting the cutting tool 76.

This relative adjustment of the member 66 relative to the sleeve 65 is effected automatically with each movement of the cutting tool in return or feeding direction by means of the draw bar 79 which is appropriately connected to the member 66 by suitable threaded connection 80 and which projects rearwardly through the rifling tool bar 62 and is connected positively by suitable thread connections 81 to a plunger 82 slidably mounted in the bore 83 of the spiral rifling groove bar 36, and arranged for axial sliding therein. It will be noted that the pin 47 carried in the sleeve 46 passes through this plunger 82 and is therefore positively connected thereto so as to definitely hold this plunger 82 with respect to the sleeve 46 and therefore the feed adjusting unit 16.

It is therefore apparent that adjustment of the pilot hand wheel 59 for relative movement of the sleeve 51 and therefore the sleeve 46 will effect similar movement of the pin 47 and in the plunger 82 just described in the bar 36 therefore causing relative movement of the member 66 with respect to the outer sleeve 67 and thereby effecting accurate adjustment of the cutting end 77 of the tool 76 in the arc 78 to effect the proper depth of cut for each passage of the tool through the gun bore.

It will also be noted that automatic tool relief is effected by the relative reversal of direction of the feeding cylinder 18 in moving the carriage 15 and the feeding unit 16 to and from the gun barrel 11. For instance, assuming the piston rod 17 to be moving to the right in Figures II, IV, and X, it will be noted that the collar 23 on the piston rod 17 will be pushing the carriage 15 to the right and thus causing the bar 36 and the bar 62 to be pulling the sleeve 65 through the gun barrel. Under these conditions it will be noted that the pin 47 will be relatively to the right with respect to the bar 36 so that the plunger 82 will likewise have been moved relative to the right bar 36 causing the surface 74 of the member 66, Figure V, to have been moved toward the pin 68 and the tool holder 69 to bring the cutting edge 77 of its tool 76 up into cutting position as determined accurately to a predetermined amount by the setting of the pilot hand wheel 59 as described. This is the condition prevailing at the time the sleeve 65 is being drawn through the gun bore toward the right in the various figures effecting the cutting action of the cutting edge 77 of the tool in each of the rifling grooves. After the cutting edge and tool 76 have come out of the right hand end of the gun sufficiently to clear their chips and cutting edge from the rifling groove therein, reversal of the cylinder 18 is then effected and the first motion taking place is that of the movement of the unit 16 without movement of the carriage 15 as caused by the lost motion between the surface 31 of the carriage 15 and the abutment collar 25 on the piston rod 17 as described. This lost motion or pre-movement of the feeding unit 16 relative to the carriage 15 causes the pin 47 to again relatively move to the left with respect to the spiral grooved bar 36, with the result that the draw rod 79 connected to the plunger 82 which is also connected to the pin 47 causes the surface 73 of the member 66 to engage and move toward the pin 68 and the tool holder 69, Figure V, resulting in the retraction of the tool cutting edge 77 in the arc 78 away from the bore of the gun barrel and as soon as this has been accomplished the collar 25 on the piston rod 17 will then have engaged the surface 31 of the carriage 15 to cause it to then be started in return rapid traverse movement thus moving the entire tool head of Figure V back through the gun bore to the left hand end while the cutting tool is thus automatically retracted away from the various rifling grooves.

After the rifling head has been moved sufficiently far through the gun so that the cutting tool 76 then projects from the left hand end thereof the indexing head 8 is then set in motion by any conventional means either manually or automatically by hydraulic mechanism associated with the carriage as set forth in the above copending application, to rotate the gun to a new indexed position for repetition of the cutting action in each rifling groove. The customary practice in such an arrangement is to move the cutting tool out to a definite depth of cut relative to the gun bore and then to continue to effect these feeding motions and complete indexing of the gun around the full circle having thus cut each rifling groove to a particular depth, then after having completed a complete set of grooves to again adjust the pilot hand wheel 59 and effect another depth of cut around the complete circle of all of the rifling grooves.

Another significant feature to be noted particularly in connection with the rifling tool head is the method of application of the coolant fluid for cooling the tool and removal of chips and the protection of this mechanism from the chips removed by the cutting tool. Coolant is supplied from the usual source through the flexible hose 84, Figure IV, and thus through a suitable conduit 85 to the bore 86 in the spiral grooved rifling bar 36 from which it passes into the bore 83 and around the plunger 82 by means of the coolant passageways 87, best seen in Figure III, and thus continues into the chamber 88 and through the bore 89 surrounding the draw rod 79 and thus through the passageway 90 into the bore 67 of the sleeve 65. It is then passed through the coolant passageway 91 formed in the sleeve 66 thus entering into the cutaway portion 70 in which is mounted the tool 69. In this way the coolant from this is brought into position to lubricate contact between the surfaces 71 and 73 and 72 and 74 as best seen in Figure V so as to prevent any foreign matter from getting on the surfaces during the operation of the rifling tool head. It will also be noted, particularly in Figure VI, that special coolant passageways 92 are provided each side of the cutting tool 76 to specifically wash the chips away from the tool proper and away from the cutting edge 77 and in the direction of travel of the broaching and the rifling tool head to the gun bore so as to at all times keep chips moving away from the cutting tool, thus preventing damage and scoring of the work during the cutting operation.

It is also to be noted that suitable enclosure plates 93 and 94 suitably fixed to the sleeve 65 by pins 95 and slidably mounted in appropriate guideways 96 and 97 in the member 66 forming tight sliding engagement with the surfaces 98 and 99 formed as a true radius from the center of the pin 68 and nicely sliding against the end portions 100 and 101 of the respective plates 93 and 94 so as to form a completely enclosed chamber of the cut out portion 70 in the member 66 save for the exit of coolant fluid from the passageways 92, Figure VI. In this way a totally enclosed mechanism is provided free of access of any foreign matter or chips while at the same time providing specific lubrication to the wearing contact surfaces between the tool holder 69 and the member 66 and also providing specific exhausting of the coolant fluid from the chamber 70 at a point directly behind the cutting tool so as to wash the chips in the proper direction of motion of the rifling tool head to the bore of the gun to prevent scoring of the work.

Having thus fully set forth and described this invention what is claimed as new and desired to secure by United States Letters Patent is:

1. In a gun rifling machine, a bed, means for rotatably mounting a gun barrel longitudinally of said bed, means for indexing said gun to a predetermined series of rotary positions, a carriage slidably mounted on said bed longitudinally thereof, a tool feeding unit mounted on said bed between said carriage and said gun barrel and slidable longitudinally thereof, a fluid pressure cylinder mounted on said bed and having a piston rod directly connected to said tool feeding unit and connected to said carriage by a lost-motion arrangement, a rifling bar connected to said carriage and supported by said tool feeding unit, a rifling tool head mounted on said bar for passing through the bore of said gun, and means for effecting feeding motion of the tool of said rifling head, radially of the axis of rotation of said gun barrel, by the relative motion of said tool feeding unit and said carriage during the operation of said lost-motion mechanism.

2. In a rifling tool head for a gun rifling machine, a sleeve slidably mounted in the bore of said gun, a tool holder pivotally mounted in said sleeve, a cutting tool formed on said tool holder and having radial swinging motion relative to the axis of said gun bore, a member movable relative to said sleeve and tool holder to effect said radial movement of the cutting edge of said tool, comprising a pair of opposed angularly related surfaces each engaging the ends of said tool holder and each side of its pivotal mounting on said sleeve, so as to form firm contacting engagement at all times with said tool holder when said member is moved relative to said sleeve.

3. In a rifling tool head for a gun rifling machine, a sleeve slidably mounted in the bore of said gun, a tool holder pivotally mounted in said sleeve, a cutting tool formed on said tool holder and having radial swinging motion relative to the axis of said gun bore, a member movable relative to said sleeve and tool holder to effect said radial movement of the cutting edge of said tool, comprising a pair of opposed angularly related surfaces each engaging the ends of said tool holder and each side of its pivotal mounting on said sleeve, so as to form firm contacting engagement at all times with said tool holder when said member is moved relative to said sleeve, means for applying coolant inside of said sleeve, and means for conducting coolant from inside of said sleeve directly to said angularly related contact surfaces engaging said tool holder.

4. In a rifling tool head for a gun rifling machine, a sleeve slidably mounted in the bore of said gun, a tool holder pivotally mounted in said sleeve, a cutting tool formed on said tool holder and having radial swinging motion relative to the axis of said gun bore, a member movable relative to said sleeve and tool holder to effect said radial movement of the cutting edge of said tool, comprising a pair of opposed angularly related surfaces each engaging the ends of said tool holder and each side of its pivotal mounting on said sleeve, so as to form firm contacting engagement at all times with said tool holder when said member is moved relative to said sleeve, means for applying coolant inside of said sleeve, and means for conducting coolant from inside of said sleeve directly to said angularly related contact surfaces engaging said tool holder, and means for conducting coolant from said member toward the rearward portion of said cutting tool behind its cutting edge and into engagement with the bore of said gun, and means for totally enclosing said tool holder and said member in said sleeve to prevent access of chips and foreign matter to the tool holder engaging surfaces of said member movable in said sleeve.

WILLIAM F. GROENE.
HARRY F. STOFFREGEN, Jr.